United States Patent [19]

Jeanty

[11] Patent Number: 5,001,765
[45] Date of Patent: Mar. 19, 1991

[54] FAST SPATIAL SEGMENTER FOR HANDWRITTEN CHARACTERS

[75] Inventor: Henry H. Jeanty, Irvington, N.Y.
[73] Assignee: International Business Machines Corporation, Armonk, N.Y.
[21] Appl. No.: 579,102
[22] Filed: Sep. 6, 1990

Related U.S. Application Data

[63] Continuation of Ser. No. 294,094, Jan. 5, 1989, abandoned.

[51] Int. Cl.$^5$ .......................... G06K 9/34; G06K 9/00
[52] U.S. Cl. ........................................... 382/9; 382/13

[56] References Cited

U.S. PATENT DOCUMENTS

| | | | |
|---|---|---|---|
| 4,024,500 | 5/1977 | Herbst et al. | 340/146.3 |
| 4,654,873 | 3/1987 | Fujisawa et al. | 382/9 |
| 4,680,804 | 7/1987 | Kuzunuki et al. | 382/13 |
| 4,718,103 | 1/1988 | Shojima et al. | 382/13 |
| 4,727,588 | 2/1988 | Fox et al. | 382/13 |
| 4,731,857 | 3/1988 | Tappert | 382/9 |

OTHER PUBLICATIONS

"Segmentation Procedure for Handwritten Symbols and Words" buy J. M. Kurtzberg et al., IBM Technical Disclosure Bulletin, vol. 25, No. 7B, Dec. 1982.
"Space-Time Segmenter for Handwritten Words" by A. S. Fox et al., IBM Technical Disclosure Bulletin, vol. 29, No. 11, Apr. 1987.

Primary Examiner—Leo H. Boudreau
Assistant Examiner—Steven P. Fallon
Attorney, Agent, or Firm—Perman & Green

[57] ABSTRACT

A character recognition system 10 includes a segmentation processor 12 which is coupled between an electronic tablet 14 and a character recognizer 18. The tablet 14 has an associated stylus or pen 15 with which a user forms symbols, such as block printing or script characters, on a surface of the tablet 14. The tablet 14 has x-axis and y-axis output signals expressive of the position of the pen 15 within an x-y tablet coordinate system. A stroke capture device 16 intercepts the x-y outputs from the tablet to generate x-y position pair data for the segmentation processor 12. An output of the segmentation processor 12 is data expressive of connected strokes and unconnected strokes which is input to the character recognizer 18. The segmentation method and apparatus segments real-time handwriting outputs from the electronic tablet by a recursive method which rapidly locates a general area in which two strokes might intersect by successively finding intersections of maximal areas or boxes associated with the strokes until an exit condition is determined.

17 Claims, 4 Drawing Sheets

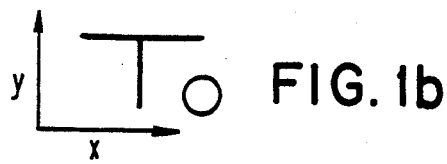
FIG. 1a
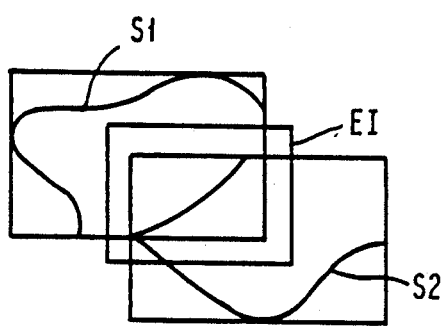
FIG. 1b
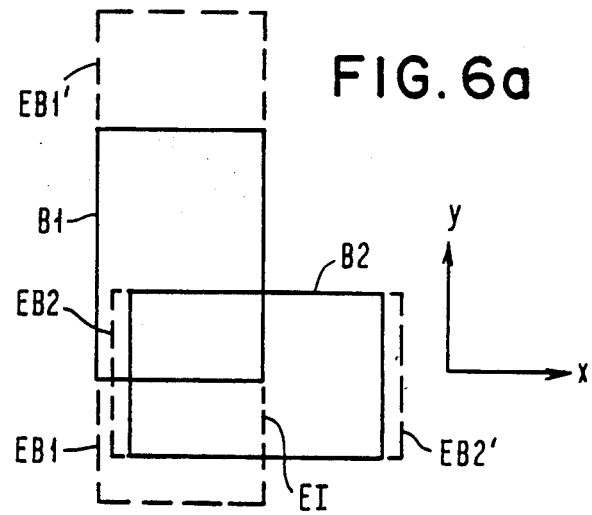
FIG. 6a
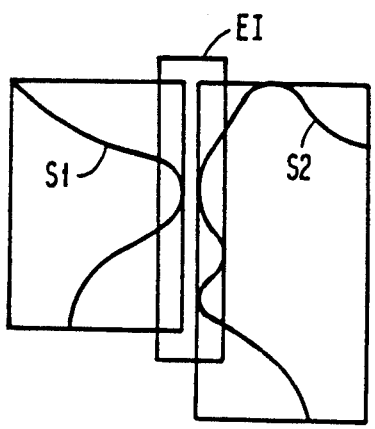
FIG. 6b
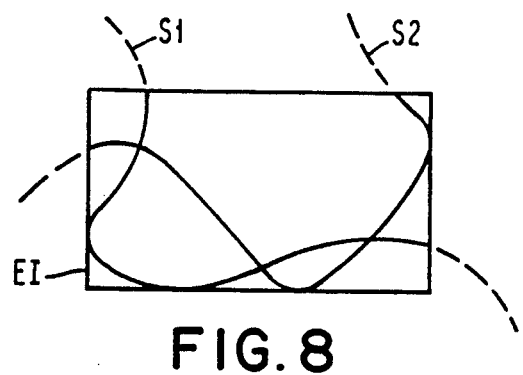
FIG. 8
FIG. 7
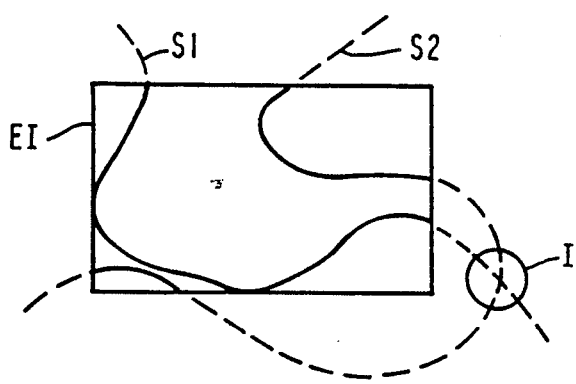
FIG. 9

FAST SPATIAL SEGMENTER FOR HANDWRITTEN CHARACTERS

This is a continuation of copending application(s) U.S. Pat. No. 07/294,094 filed on Jan. 5, 1989, now abandoned.

FIELD OF THE INVENTION

This invention relates generally to hand-written character recognition and, in particular, to a fast character segmentation preprocessor which determines the presence or absence of connectivity between strokes.

BACKGROUND OF THE INVENTION

Symbols, such as handwriting, traced on electronic tablets are usually represented by sequences of x-y coordinate pairs. A fundamental unit of handwriting is the stroke wherein a stroke can be considered as a sequence of points, represented by their respective x-y coordinates, which are generated between a tablet pen-down and pen-up motion of the writer. Characters are collections or sets of such strokes. By example, in FIG. 1a there are illustrated various numbered sequences of strokes which generate the printed characters A, B, C and D. Data processing systems which are operable for identifying a set of such strokes as a particular alphanumeric character are known and it is to these types of systems that the invention is directed.

In such a character identification system an important processing step is known as segmentation. Segmentation involves pre-processing, prior to processing by the character recognizer, the stroke input data to partition the strokes of a character, a gesture or possibly a word.

In that the strokes which make up a given character are usually interconnected it is the accurate determination of the stroke interconnectivity which is important for the successful operation of a segmentation preprocessor. That is, a successful segmenter must be able to accurately determine groups of connected strokes.

When pre-processing on-line data, that is processing data in a real-time manner as the writer writes it, some conventional segmenters employ temporal information to detect groups of connected strokes. This temporal method is based on an observation that writers tend to pause between words. However, this type of temporal information can be unreliable. Also, temporal data is sometimes not available for tablet input data which has been previously stored or buffered prior to input to the segmenter.

One conventional spatial approach to segmentation is to detect overlapping parts of strokes along the x-axis of the tablet. Essentially, the vertical projections of strokes are checked for intersections. This method can yield reasonably accurate results when segmenting discrete or block writing where characters are well spaced. A disadvantage of this method is that when characters are not well spaced their projections onto the x-axis often overlap even if the characters themselves do not intersect. As illustrated in FIG. 1b, the horizontal stroke of the capital "T" projects onto that portion of the x-axis occupied by the lowercase "o". This condition can result in a segmentation error.

Another spatial approach is two-dimensional and computes the distance between every pair of points (p1,p2) where p1 belongs to stroke 1 and p2 to stroke 2. By finding the smallest of these distances an algorithm determines whether two strokes intersect one another or come so close to one other as to be considered connected. One considerable disadvantage of this approach is that it is computationally intensive, especially in those applications where the average number N of points per stroke is large. For each pair of strokes it requires on the order of $O(N^2)$ to find the shortest distance between two points. This can result in poor computational performance and may preclude real-time applications. Another disadvantage of this approach is that it can be "fooled" by a fast writer wherein the number of points per stroke is reduced and the distance between adjacent points is increased. If two rapidly drawn strokes cross, computing the distance between all pairs of points may not locate the intersection due to the distance between adjacent points.

SUMMARY OF THE INVENTION

In accordance with the invention a segmentation method segments real-time handwriting outputs from an electronic tablet. The method is a recursive method which rapidly locates a general area in which two strokes might intersect by successively finding intersections of maximal areas or boxes associated with the strokes until an exit condition is determined.

In accordance with apparatus of the invention a character segmentation processor for handwritten symbols is coupled to a writing stylus, tablet and data generation means which provides data indicating x-axis and y-axis displacements of points associated with a stroke of the stylus relative to a surface of the tablet. The processor includes apparatus for indicating maximum and minimum x-axis and y-axis coordinates of a set of points associated with the stroke of the stylus and apparatus for determining the x-axis and y-axis coordinates of an area within which the indicated maximum and minimum x-axis and y-axis coordinates associated with the stroke are contained. The processor further include apparatus for processing a first area associated with a first stroke and a second area associated with a second stroke to determine if the strokes are connected one to another.

In accordance with a method of the invention there is described for use in a character recognition system for recognizing handwritten symbols, the system including a writing stylus, a tablet and data generation means for providing data indicating x-axis and y-axis displacements of points associated with a stroke of the stylus relative to a surface of the tablet, a method of segmenting strokes into characters. The method includes the steps of indicating maximum and minimum x-axis and y-axis coordinates of individual ones of a set of points associated with the stroke of the stylus; determining the x-axis and y-axis coordinates of a block area within which the indicated maximum and minimum x-axis and y-axis coordinates associated with the stroke are contained; and processing a first block area associated with a first stroke and a second block area associated with a second stroke to determine if the first and the second strokes are physically or logically connected one to another.

BRIEF DESCRIPTION OF THE DRAWING

The above set forth and other features of the invention are made more apparent in the ensuing Detailed Description of the Invention when read in conjunction with the attached Drawing, wherein:

FIG. 1a illustrates the strokes associated with four symbols such as alphanumeric characters;

FIG. 1b illustrates two characters with strokes which overlap along an x-axis;

FIG. 6a, 6b and 7 illustrate an extended intersection of two maximal boxes;

FIG. 8 illustrates a condition where strokes S1 and S2 pass through an intersection box only once;

FIG. 9 illustrates a condition where strokes S1 and S2 are intertwined in that stroke S2 passes through an intersection box more than one time;

DETAILED DESCRIPTION OF THE INVENTION

Figure 2:
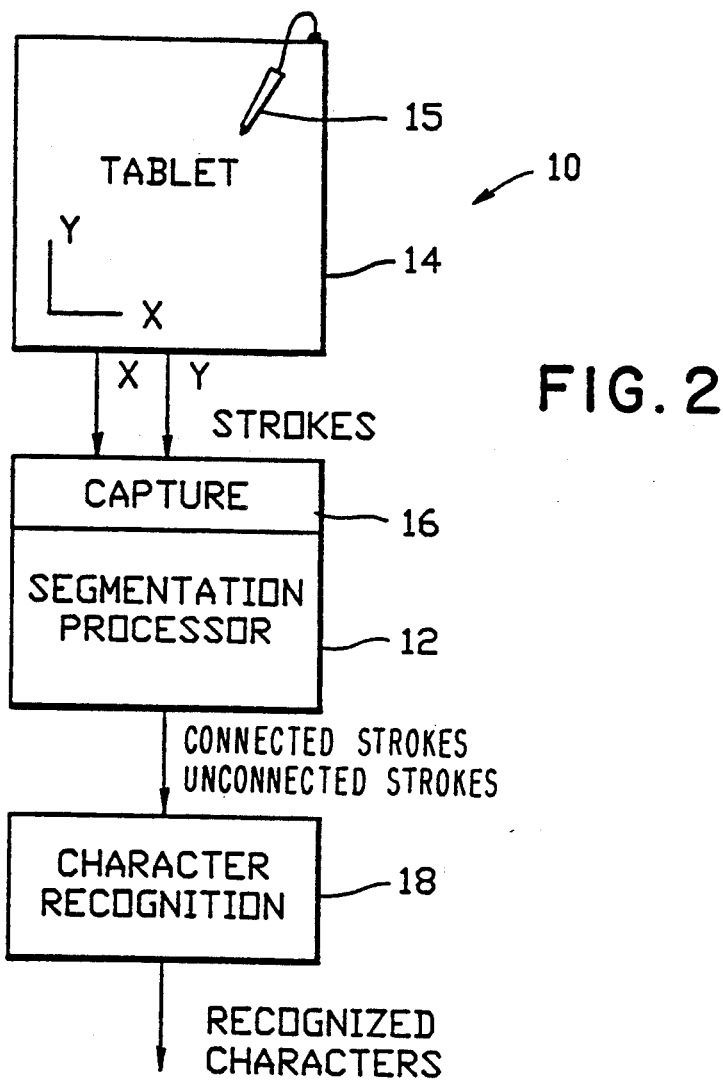
FIG. 2 is a block diagram of a character recognition system constructed and operated in accordance with the invention.

Referring to FIG. 2 there is shown in block diagram form a character recognition system 10 which includes a segmentation processor 12 which is coupled between an electronic tablet 14 and a character recognizer 18. Tablet 14 can be any of a number of suitable commercially available electronic tablets. The tablet 14 has an associated stylus or pen 15 with which a user forms symbols, such as block printing or script alphanumeric characters, on a surface of the tablet 14. The tablet 14 has x-axis and y-axis output signals expressive of the position of the pen 15 on an x-y tablet coordinate system. A stroke capture means 16 may be a software task which intercepts the x-y outputs from the tablet to generate x-y position pair data for the segmentation processor 12 of the invention. An output of the segmentation processor 12 is data expressive of connected strokes and unconnected strokes which is input to the character recognizer 18, it being remembered that connected strokes are generally associated with a character. Character recognizer 18 may be any suitable type of known character recognizer which determines an identity of a connected group of strokes and which has an output expressive of identified symbols such as alphanumeric characters.

In this regard it should be realized that the invention is applicable to the identification of any type of drawn symbol wherein a given symbol is composed of at least one stroke. As such, the system 10 may recognize symbols associated with written characters of various languages and also mathematical and other types of symbols. Furthermore, the segmentation processor 12 may be embodied in a number of suitable hardware or software forms such as special purpose circuitry or computer instructions. By example, an embodiment of the segmentation processor of the invention was implemented with instructions written in the C programming language which were executed on an IBM RT PC computer running under AIX (IBM, RT PC and AIX are each a registered trademark of the International Business Machines Corporation).

Figure 3:
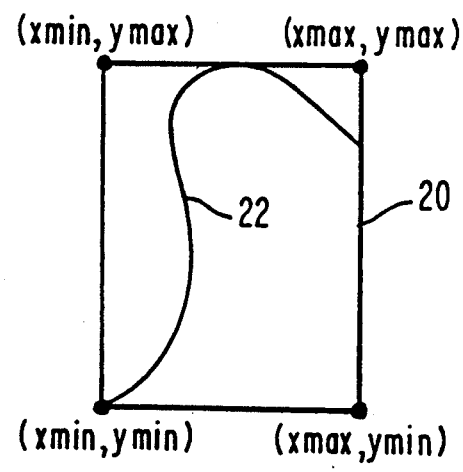
FIG. 3 illustrates a maximal box having linear dimensions defined by the smallest and largest x-axis and y-axis coordinates of a stroke.

Referring to FIG. 3 there is shown a maximal area or block, shown as a box 20, having linear dimensions defined by the smallest and largest x-axis and y-axis coordinates of a stroke 22. The four corners of the maximal box 20 of the stroke 22 have coordinates (xmin,ymin), (xmin,ymax), (xmax,ymax) and (xmax,ymin) starting with the lower left corner and continuing in a clockwise direction.

Figure 4:
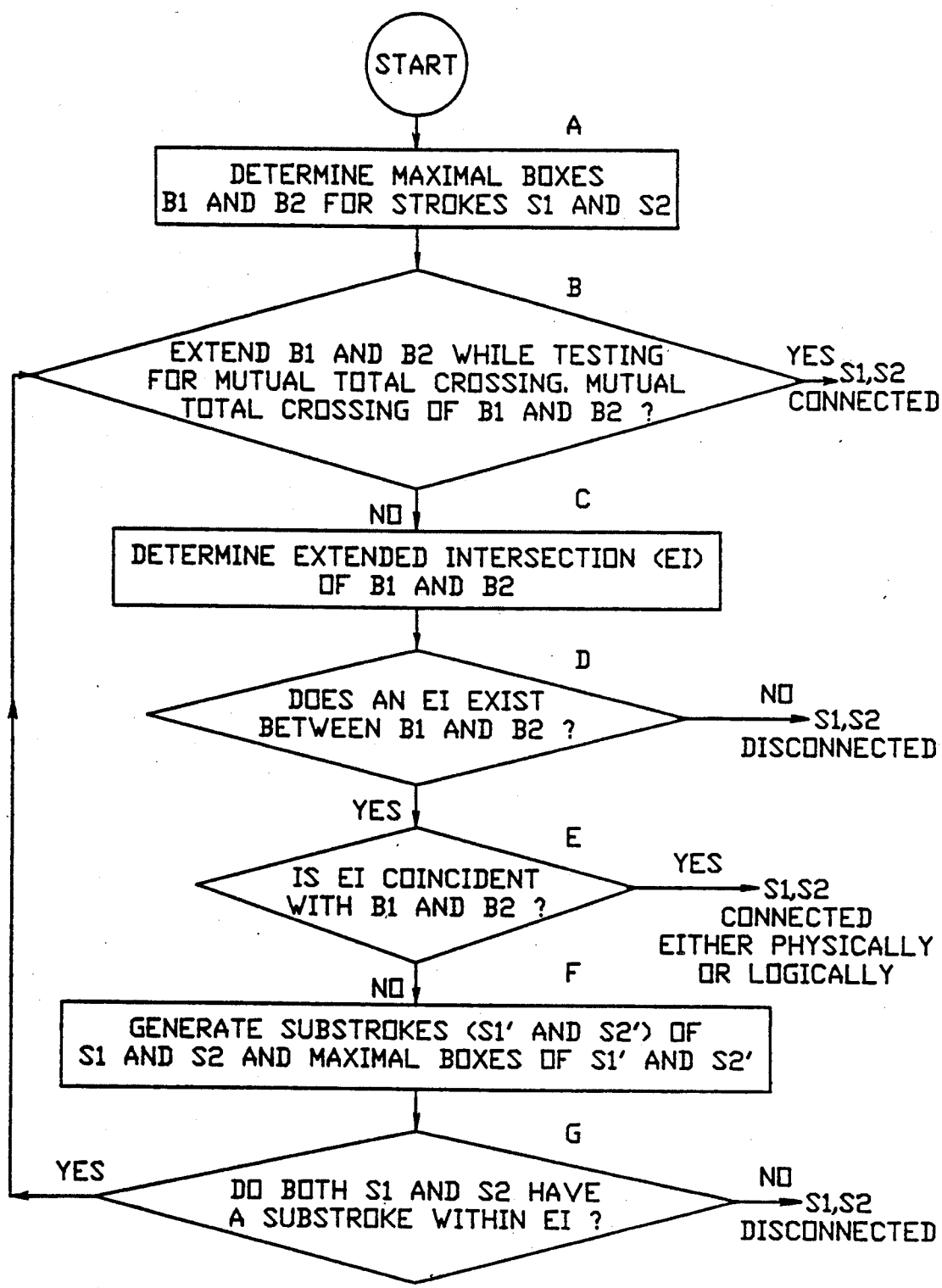
FIG. 4 shows various steps of a spatial segmentation method of the invention.

Referring to the flowchart of FIG. 4 there are shown various steps of the spatial segmentation method of the invention. Each of these steps is now described in detail.

Figure 5A:
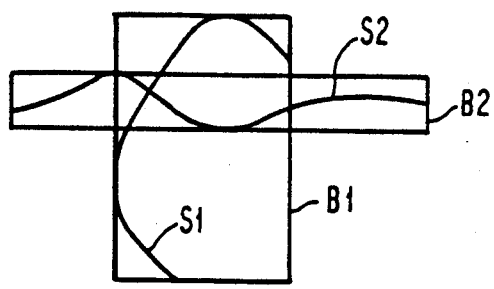
FIG. 5a shows the maximal boxes B1 and B2 associated with strokes S1 and S2 in one form of a mutually totally crossing configuration.

In step A there are found, and referring to FIG. 5a, the maximal boxes B1 and B2 associated with strokes S1 and S2, respectively. This step is readily accomplished in conjunction with the stroke capture means 16 which may be embodied, as has been mentioned, by a program task which captures the x-axis and the y-axis coordinates of the stroke points from the tablet 14 and which further records the largest and smallest x-y coordinate values associated with each stroke.

Figure 5B:
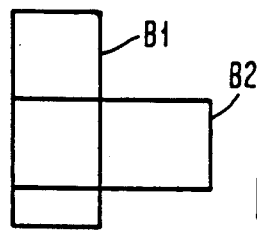
FIG. 5b shows the maximal boxes B1 and B2 associated with strokes S1 and S2 in another form of a mutually totally crossing configuration.

In step B a test is made for a "mutual total crossing" condition of B1 and B2. As seen in FIG. 5a, this condition occurs when an extended B1 totally crosses an extended B2 along one axis and an extended B2 totally crosses an extended B1 along the other axis. If the mutual total crossing condition exists S1 and S2 must intersect and are thus connected strokes. This step of the method advantageously detects the interconnection of strokes that were written quickly in that it does not rely directly on the points or distance between points which construct each stroke but instead on the maximal boxes defined by the strokes. The two boxes are considered to mutually and totally cross if their edges are at least coincident along the x and the y axes. As seen in FIG. 5b box B1 totally crosses the two horizontal edges of box B2 along the y axis while box B2 totally crosses the right vertical edge of B1 and is coincident with the left vertical edge of B1. Boxes B1 and B2 are thus also considered to totally and mutually cross one another.

The mutual total crossing test is facilitated by extending a first one of the boxes along a first axis and extending a second one of the boxes along a second axis perpendicular to the first axis. After extending both boxes a test is made to determine if the first box totally and mutually crosses the second box along the first axis and if the second box totally and mutually crosses the first box along the second axis. If this test is successful then the two boxes are considered to totally and mutually cross one another and the strokes which they contain are considered to be connected. If this test fails a second test is accomplished by extending the first box along the second axis, extending the second box along the first axis and then testing to determine if the first box totally and mutually crosses the second box along the second axis and if the second box totally and mutually crosses the first box along the first axis. If this second test is successful then the two strokes are considered to be connected.

In accordance with this aspect of the invention FIG. 6a illustrates a first maximal box B1 and a second maximal box B2. The strokes associated with these boxes are not shown. As an example, step B of the method is accomplished by first extending B1 along the x-axis and B2 along the y-axis and then testing to see if B1 totally and mutually crosses B2 along the x-axis and if B2 totally and mutually crosses B1 along the y-axis. For the two boxes illustrated this portion of the test fails. Next, and as is shown in FIG. 6a, B1 is extended along the y-axis and B2 is extended along the x-axis. A test is made to determine if B1 totally and mutually crosses B2 along the y-axis and if B2 totally and mutually crosses B1 along the x-axis. Once again, for the boxes illustrated, this test fails. Thus, the total mutual crossing condition would not be found and the method proceeds to step C.

As an example, a box is extended by approximately 15% to 20% of the length of the box along the x-axis to form the extended region shown as EB2. The other box is extended by approximately 50% of the length of the box along the y-axis to form the region EB1. The boxes are preferably extended along two sides, as shown by the extended regions EB1' and EB2'. Step C determines the coordinates of the region of intersection of the two extended maximal boxes; that is, the "extended intersection" of the two boxes. If S1 and S2 are connected or if they come near to one other their intersection must be located within the region of intersection of the two maximal boxes. As can be seen in FIG. 6b another form of an extended intersection is an intersection of the two maximal boxes after an extended strip of constant width is added to the two boxes. The construction of the extended intersection allows for the case, as in FIG. 7, of two strokes S1 and S2 which are not connected but which come near to one another at several points. The extended intersection is itself generally rectangular since the method deals normally with rectangular areas having only vertical and horizontal sides.

As has been stated, the width of the extension may be a fixed amount which is added equally to all sides of the intersection box. Preferably the width of the extension is adaptively varied as a function of the dimensions of the maximal box to which it is associated in order to accommodate variations in writing styles and even variations among characters written by a single writer. Thus, for some applications the width by which the boxes are extended may be zero or some small amount while for other applications the width may be substantial.

At step D a test is made to determine if the extended B1 and extended B2 intersect, that is, if an extended intersection is created. If there is no intersection of the extended B1 and B2 then S1 and S2 are not connected and furthermore do not come near enough to one other to be considered connected. If there is an extended intersection of B1 and B2 then the method continues to step E.

At step E a test is made to determine if the corner x and y coordinates of the extended intersection box are the same as that of both maximal boxes for this iteration. For example and referring briefly to FIG. 10, a sixth iteration of the method produces the extended intersection box labeled 6. In this case both maximal boxes are coincident with the intersection region in that they have the same coordinates as the intersection box between them. When this condition is found to exist the method can be terminated without a further iteration of step B in that total mutual crossing will be found. That is, this condition is equivalent to the total mutual crossing condition. Thus, S1 and S2 are connected and the method ends. If the corner coordinates of the intersection box are found in step E to be not the same as that of the extended maximal boxes then the method continues to step F.

It should be noted that the method of the invention considers strokes to be connected if they intersect, or are very close to one another, or are intertwined.

An intersection of two strokes defines a case where both S1 and S2 go through the intersection box only once, as shown in FIG. 8. In this case it would be impossible for S1 and S2 to be bounded by the same limits in both the x and y direction and not cross somewhere within the intersection box. This can be readily realized if one considers the two strokes S1 and S2 as two paths P1 and P2, respectively, with P1 starting anywhere within the intersection box and winding its way to an arbitrary point of the intersection box. P1 cannot wander outside of the intersection box and further must touch at least one point on each of the four sides of the intersection box. P2 follows the same rules and constraints. Given these conditions P1 and P2 must somewhere cross paths, or intersect, within the confines of the intersection box. Thus S1 and S2 intersect and are physically connected.

Two strokes are considered to be intertwined if the original strokes S1 and S2 enter an intersection box more than once. As shown in FIG. 9, and in accordance with the foregoing example, P1 and P2 need not cross one another. Therefore S1 and S2 may or may not be physically connected at the point shown as I, depending for example on the curvature of S2 and/or the length of S1. Yet if two strokes are found in such an intertwined relationship they are considered, for segmentation purposes, to be logically connected. This is because, in handwriting, a writer normally intentionally constrains the strokes of individual characters to be connected or in close proximity to one another.

Returning now to step F there is generated two substrokes which are the points of S1 and S2 belonging to the intersection box. This is accomplished by testing, for each point of S1 and S2, if the x-y coordinates of a point are within the range of the x-y coordinates which define the intersection box. This step also establishes the coordinates of a maximal box associated with each substroke, the maximal box being determined as before for the entire stroke.

At step G a determination is made if both S1 and S2 have points located inside the extended intersection box. That is, if both S1 and S2 have substrokes within the extended intersection box. If this condition is found to be true then both S1 and S2 are replaced by their respective substrokes S1' and S2'. This is accomplished by replacing S1 with the points of S1 (S1') which are contained within the extended intersection box and by replacing S2 with the points of S2 (S2') which are contained within the intersection box. A further iteration is then performed employing the maximal boxes associated with the substrokes S1' and S2'.

If however it is determined that neither S1 and/or S2 has a point contained within the extended intersection box, then S1 and S2 are assumed to be disconnected. This assumption is based on the consideration that if one of the strokes does not have a point contained within the extended intersection box, this stroke cannot possibly have any connection with the other stroke, or even lie closely adjacent to the other stroke. In that the two strokes are considered to be disconnected the method terminates and indicates that the strokes are not connected.

Figure 10:
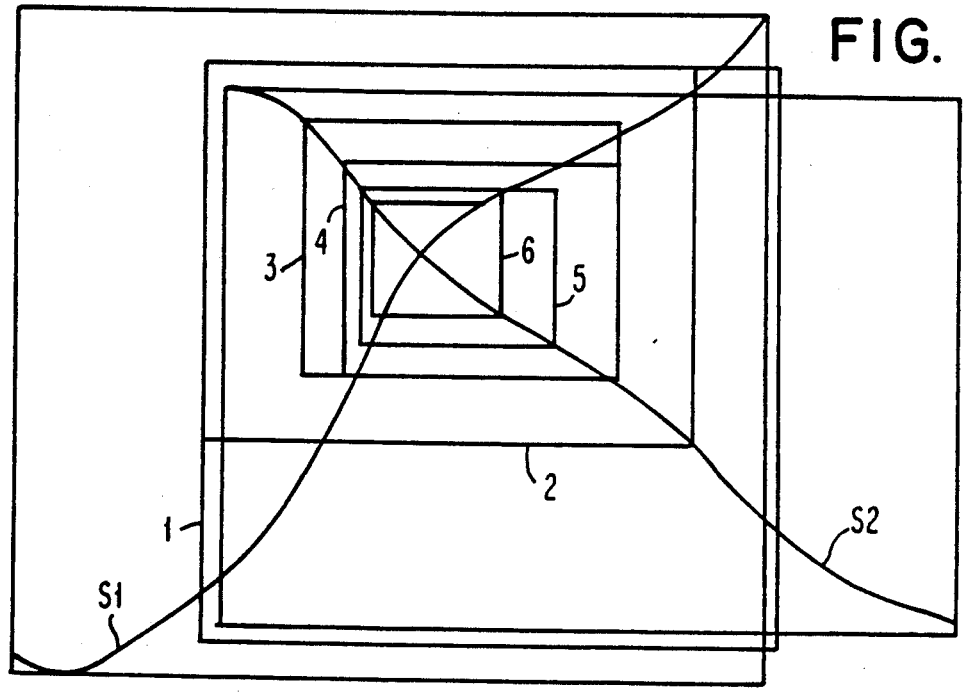
FIG. 10 shows the result of six iterations of the method of the invention with two physically connected strokes S1 and S2.

FIG. 10 illustrates the result of six iterations of the method of the invention with two physically connected strokes S1 and S2. After the sixth iteration the extended box size remains invariant and the two strokes are found to be connected. The numbers 1-6 indicate the extended intersection box obtained after a particular iteration. B1 and B2 indicate the initial maximal boxes associated with S1 and S2, respectively.

Figure 12:
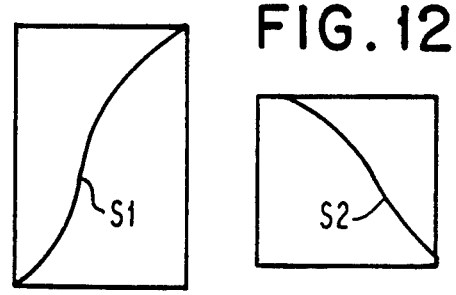
FIG. 12 shows two disconnected strokes S1 and S2.

FIG. 12 illustrates two strokes S1 and S2 wherein the mutual total crossing test of step B fails. Furthermore, depending on the amount that B1 and B2 are each extended during step C, step D may also fail thereby indicating that S1 and S2 are not connected.

Figure 13:
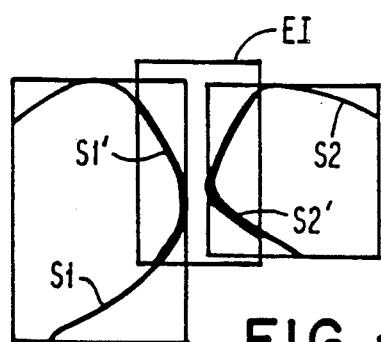
FIG. 13 shows two closely adjacent strokes S1 and S2 and the substrokes S1' and S2' of S1 and S2, respectively.

FIG. 13 illustrates two closely adjacent strokes S1 and S2. On a second iteration of the method the extended intersection box size will be found to remain invariant and the two strokes are considered to be connected. S1' and S2' show the substrokes of S1 and S2, respectively, the substrokes being those points of the stroke contained within the extended intersection box.

As can be appreciated, one significant advantage of the method of the invention is an enhanced speed of execution. This is a result of the fact that relatively few calculations are involved as compared to previously described conventional approaches. The most computationally intensive step of the method is step F which determines the points of substrokes which lie within a particular rectangular area. However, this determination is accomplished by rapidly executed comparisons between the coordinates of points of the stroke and the coordinates of the intersection box. As was stated, some conventional methods employ more complex computations such a distance measures which must be applied for all pairs of points of the entire strokes being analyzed, thereby precluding real-time applications. The method of the invention however has been found suitable for use with real-time applications.

Figure 11:
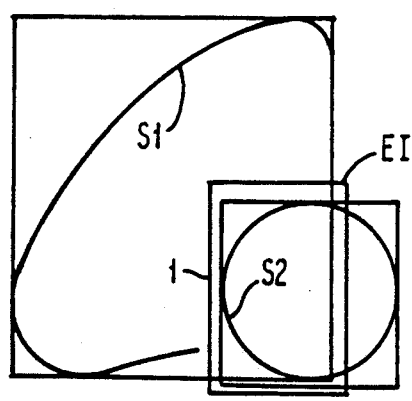
FIG. 11 illustrates two disconnected strokes with x-axis overlap and shows the result of one iteration of the method wherein it is determined that no point of S1 is included within the extended intersection box.

Another advantage of the method of the invention is that it efficiently handles cases such as those depicted in FIG. 5, FIG. 6a and FIG. 11. For example, FIG. 11 illustrates two disconnected strokes with x-axis overlap and shows the result of one iteration of the method wherein it is determined that no point of S1 is included within the extended intersection box. In such cases, step G of the first iteration detects that there is no intersection between S1 and S2. Conventional methods based on overlap of x-projections of strokes cannot readily deal with such cases while conventional methods based on interpoint distances must first compute the distances between all pairs of points before arriving at the conclusion that there is no intersection. Even then, distance based methods must also ensure that they are not dealing with the case of two strokes drawn very quickly and which have a wide separation between points.

It should be realized that variations in and certain reordering of the steps of the method of the invention can be accomplished while still achieving the same result. For example, step E is optional in that if the coordinates of the intersection box are the same as that of the two maximal boxes for that iteration a further iteration will indicate that the two strokes are connected at step B. Performing step E however enhances the speed of execution of the method by terminating the method before the execution of steps F and G. As another example, it can be appreciated that once the substroke of S1 relative to the intersection box is found at step F that the substroke of S2 can be determined relative to the coordinates of the maximal box associated with the substroke of S1 instead of the coordinates of the intersection box. That is, instead of finding the substroke of each stroke relative to the intersection box only one of the strokes need be compared to the intersection box while the other stroke is compared to the maximal box of the first substroke. In accordance with this variation of the method if S2 is found to have no points within the maximal box associated with the substroke of S1 then the method can be terminated to indicate that S1 and S2 are not connected, otherwise a further iteration is accomplished.

Thus, while the invention has been particularly shown and described with respect to a preferred embodiment thereof, it will be understood by those skilled in the art that changes in form and details may be made therein without departing from the spirit and scope of the invention.

Having thus described my invention, what I claim as new, and desire to secure by Letters Patent is:

1. A segmentation processor for handwritten symbols, the processor being coupled to output signals of a writing stylus, tablet and data generation means which provide data indicating x-axis and y-axis displacements of points associated with a stroke of the stylus relative to a surface of the tablet; the processor comprising:

means for identifying maximum and minimum x-axis and y-axis coordinates of a set of points associated with the stroke of the stylus;

means for determining the x-axis and y-axis coordinates of an area within which the identified maximum and minimum x-axis and y-axis coordinates associated with an individual stroke are contained, the area having a length along the y-axis and a width along the x-axis; and means for processing a first area associated with a first stroke and a second area associated with a second stroke to determine if the first stroke and the second stroke are physically or logically connected one to another and form all of or a portion of a discrete handwritten character or symbol.

2. A segmentation processor as set forth in claim 1 wherein the means for processing comprises means for determining the x-axis and the y-axis coordinates of a region of intersection of the first and the second areas.

3. A segmentation processor for handwritten symbols, the processor being coupled to output signals of a writing stylus, tablet and data generation means which provide data indicating x-axis and y-axis displacements of points associated with a stroke of the stylus relative to a surface of the tablet; the processor comprising:

means for identifying maximum and minimum x-axis and y-axis coordinates of a set of points associated with the stroke of the stylus; means for determining the x-axis and y-axis coordinates of an area within which the identified maximum and minimum x-axis and y-axis coordinates associated with an individual stroke are contained, the area having a length along the y-axis and a width along the x-axis; and means for processing a first area associated with a first stroke and a second area associated with a second stroke to determine if the first stroke and the second stroke are physically or logically connected on to another; wherein the means for processing comprises means for determining the x-axis and the y-axis coordinates of a region of intersection of the first and the second area; and wherein the means for processing further comprises means for determining if the first area and the second area mutually and totally cross one another along the x-axis and along the y-axis.

4. A segmentation processor as set forth in claim 3 wherein the means for processing further comprises means for extending both the first and the second areas by at least a first predetermined amount along the y-axis and by at least a second predetermined amount along the x-axis.

5. A segmentation processor as set forth in claim 4 wherein the first predetermined amount is substantially equal to the second predetermined amount.

6. A segmentation processor as set forth in claim 4 wherein the first predetermined amount is substantially equal to approximately 50% of the length of the area along the y-axis and wherein the second predetermined amount is substantially equal to approximately 15% to approximately 20% of the width of the area along the x-axis.

7. A segmentation processor as set forth in claim 4 wherein the means for processing further comprises means for determining if an area of a region of intersection between the first and the second areas is substantially coincident to each of the first and the second areas.

8. A segmentation processor as set forth in claim 7 wherein the means for processing further comprises means for determining a substroke of the stroke associated with the first area and a substroke of the stroke associated with the second area, each of the substrokes having at least one point having x-axis and y-axis coordinates which are contained within the area of the region of intersection.

9. In a recognition system for recognizing handwritten symbols, the system including a writing stylus, a tablet and data generation means for providing data indicating x-axis and y-axis displacements of points associated with a stroke of the stylus relative to a surface of the tablet, a method of segmenting strokes into symbols such as characters comprising the steps of:

identifying maximum and minimum x-axis and y-axis coordinates of individual ones of a set of points associated with the stroke of the stylus;

determining the x-axis and y-axis coordinates of a block area within which the identified maximum and minimum x-axis and y-axis coordinates associated with the stroke are contained; and processing a first block area associated with a first stroke and a second block area associated with a second stroke to determine if the first and the second strokes are physically or logically connected one to another, wherein the step of processing includes a step of determining if the first block area intersects at least a portion of the second block area, and wherein the step of processing further includes a step of:

determining if the block areas associated with the first stroke and the second stroke mutually and totally cross one another along the x-axis and the y-axis; and if the block areas are so determined to mutually and totally cross one another, indicating that the first and the second stroke are connected one to another.

10. A method as set forth in claim 9 wherein the step of determining if the block area mutually and totally cross further includes the initial steps of extending one of the block areas at least along the y-axis by a first predetermined amount and extending the other one of the block area at least along the x-axis by a second predetermined amount.

11. A method as set forth in claim 10 wherein the first predetermined amount is substantially equal to the second predetermined amount.

12. A method as set forth in claim 10 wherein the first predetermined amount is substantially equal to approximately 50% of a length of the block area along the y-axis and wherein the second predetermined amount is substantially equal to approximately 15% to approximately 20% of a width of the block area along the x-axis.

13. A method as set forth in claim 10 wherein the step of processing further includes a step of determining if an area of the region of intersection is substantially coincident with each of the first and the second block areas and, if the area of the region of intersection is determined to be substantially coincident with the area of each of the first and the second block areas, indicating that the two strokes associated with the two block areas are connected.

14. A method as set forth in claim 13 wherein, if the area of the region of intersection is determined not to be substantially equal to the area of each of the first and the second block areas, the step of processing further includes a step of determining a substroke of the stroke associated with the first block area and a substroke of the stroke associated with the second block area, each of the substrokes being determined to have at least one point having x-axis and y-axis coordinates which are contained within the area of the region of intersection.

15. In a recognition system for recognizing handwritten symbols, the system including a writing stylus, a tablet and data generation means for providing data indicating x-axis and y-axis displacements of points associated with a stroke of the stylus relative to a surface of the tablet, a method of segmenting strokes into characters comprising the steps of:

(a) indicating maximum and minimum x-axis and y-axis coordinates of individual ones of a set of points associated with the stroke of the stylus;

(b) determining the x-axis and the y-axis coordinates of a block area within which the indicated maximum and minimum x-axis and y-axis coordinates are contained; and (c) processing a first block area associated with a first stroke and a second block area associated with a second stroke to determine if the first and the second strokes are physically or logically connected one to another, wherein the step of processing includes the steps of:

(d) extending the first block area at least along the y-axis by a first predetermined amount and extending the second block area at least along the x-axis by a second predetermined amount;

(e) determining if the first and the second block areas mutually and totally cross one another along the x-axis and the y-axis; and if the block areas are so determined to mutually and totally cross one another, (f) indicating that the first stroke and the second stroke are connected one to another;

if the block areas are determined to not mutually and totally cross one another, (g) extending the first block area at least along the x-axis by a first predetermined amount and extending the second block area at least along the y-axis by a second predetermined amount;

(h) determining if the first and the second block areas mutually and totally cross one another along the x-axis and the y-axis; and if the block areas are so determined to mutually and totally cross one another, (i) indicating that the first stroke and the second stroke are connected one to another;

if the block areas are determined to not mutually and totally cross one another, (j) determining if the two extended block areas share an area of intersection; and if the two extended block areas do not share an area of intersection, (k) indicating that the two strokes are disconnected one from the other;

if the two extended block areas do share an area of intersection, (l) determining a first substroke of the stroke associated with the first block area and a second substroke of the stroke associated with the second block area, each of the substrokes having at least one point having x-axis and y-axis coordinates which are contained within the area of intersection; and if neither the first stroke and/or the second stroke have a substroke within the area of intersection, (m) indicating that the two strokes are disconnected and terminating the steps of the method; else (n) determining the x-axis and the y-axis coordinates of a first block area associated with the first substroke and the x-axis and y-axis coordinates of a second block area associated with the second substroke; and (o) repetitively executing steps (d) through (n) utilizing the block areas associated with the substrokes until the first and the second strokes are determined to be either connected to one another or unconnected from one another.

16. A method as set forth in claim 15 wherein, subsequent to the execution of step (j) and if the two extended block areas do share an area of intersection, further includes the steps of:

determining if the area of intersection is substantially coincident with the area of each of the first and the second extended block areas; and if the area of intersection is determined to be substantially coincident to the area of each of the first and the second extended block areas, indicating that the first stroke and the second stroke are connected one to another.

17. A method as set forth in claim 15 wherein steps (1) through (n) are replaced by the steps of:

(1) determining a first substroke, if any, of the stroke associated with the first block area, the first substroke having at least one point having x-axis and y-axis coordinates which are contained within the area of intersection;

(m) determining the x-axis and the y-axis coordinates of a block area associated with the first substroke;

(n) determining a second substroke, if any, of the stroke associated with the second block area, the second substroke having at least one point having x-axis and y-axis coordinates which are contained within the block area associated with the first substroke;

if a second substroke is determined not to have at least one point within the block area of the first substroke indicating that the two strokes are not connected, otherwise (o) determining the x-axis and the y-axis coordinates of a block area associated with the second substroke, and;

(p) repetitively executing steps (d) through (o) until the first and the second strokes are determined to be either connected to one another or unconnected from one another.

* * * * *